UNITED STATES PATENT OFFICE.

EDGARD CISELET AND CAMILLE DEGUIDE, OF BRUSSELS, BELGIUM.

TREATMENT OF NATURAL CALCIUM PHOSPHATE.

1,214,008.             Specification of Letters Patent.     Patented Jan. 30, 1917.

No Drawing.       Application filed February 19, 1914. Serial No. 819,774.

*To all whom it may concern:*

Be it known that we, EDGARD CISELET and CAMILLE DEGUIDE, subjects of the King of the Belgians, residing at 189 Avenue Brugmann and 100 Avenue Lepoutre, Brussels, Belgium, have invented certain new and useful Improvements in the Treatment of Natural Calcium Phosphate, of which the following is a specification.

The present invention has for its object to render natural phosphates of lime and the like, in particular poor chalky phosphates, readily assimilable by plants, without having recourse to the use of acids, and by using a re-agent which can be regenerated.

It is based as the fact newly observed that calcium chlorid mixed with crystalline tricalcium phosphate which is not assimilable by plants, and heated to a convenient temperature, modifies the physical state of the phosphate and converts it into easily assimilable tri-calcium phosphate.

According to this invention, the usual treatment with sulfuric acid is dispensed with. The phosphates to be treated are dissolved in a melted neutral salt such as calcium chlorid which may be subsequently eliminated by washing and recovered, the phosphate of lime being deposited in the form of an amorphous powder which is easily assimilated by the roots of plants.

In comparison with the treatment with sulfuric acid, this process has great advantages both from the point of view of economy and quality of the product obtained. Thus, as the dissolvent is a soluble salt and can be almost wholly recovered the cost of manufacture is reduced to practically that necessary for carrying out the manipulations. Furthermore, by the use of a neutral salt, the effect of which does not decrease the richness of the treated phosphate, poor phosphates may be converted into comparatively rich fertilizers. The latter, while being perfectly assimilable by plants, do not possess any acid character which may have a detrimental effect on the said plants. Finally, lime which generally accompanies tricalcic phosphate in natural phosphates, is not affected by a neutral salt as it is by acids so that the fertilizer manufactured in accordance with this invention contains all the lime which was originally contained in the treated phosphate.

The process may be carried out in the following manner: The phosphate to be treated which is preferably previously crushed, is mixed with a concentrated solution of a suitable neutral salt, such as calcium chlorid. The mass is subsequently dried and then heated to a temperature of about 1000° C. in a furnace. Under the action of heat the mass melts and the phosphate of lime as well as lime which may be accompanying it, are dissolved in the melted chlorid of calcium. After a certain time, the mass is withdrawn from the furnace, crushed and then subjected to a methodical washing in water which dissolves the calcium chlorid. The phosphate of lime which is insoluble in water and is collected, dried and crushed, is then obtained in the form of an amorphous powder suitable for being easily assimilated by the roots of plants. Furthermore, the calcium chlorid carried away by the washing water, may be recovered and thereby serve for a fresh treatment.

The following proportions, which are given by way of example, will produce good results in practice:—To 100 kilograms of poor chalky phosphate containing 40% of tricalcic phosphate and 47% of carbonate of lime, 49 kilograms of calcium chlorid in solution, the coefficient of concentration of which is 50%, are added. After drying, the resulting mass is subjected to the hereinbefore described operations.

What we claim and desire to secure by Letters Patent of the United States is:

1. In a process for the preparation of assimilable phosphates, dissolving natural phosphate in melted calcium chlorid and eliminating the calcium chlorid by washing.

2. In a process for the preparation of assimilable phosphates, mixing natural phosphate with a concentrated solution of calcium chlorid, drying the mixture thus obtained, melting said mixture by the action of heat, submitting the mass to washing with water, collecting the phosphate and recovering the calcium chlorid carried away by the water.

3. In a process for the preparation of assimilable phosphates, crushing natural phosphate, mixing said phosphate with a concentrated solution of calcium chlorid, drying the mixture, heating said mixture to about 1000° C. cooling the mass thus obtained, crushing said mass, washing the same with water, collecting and drying the phosphate, and recovering the calcium chlorid carried away by the water.

4. In a process for the preparation of assimilable phosphates, crushing natural phosphate, mixing about 100 parts by weight of said phosphate with about 50 parts by weight of calcium chlorid in solution, the coefficient of concentration of which is 50%, heating said mixture to about 1000° C. in a furnace, cooling, crushing and washing with water the mass thus obtained, collecting and drying the phosphate, and recovering the calcium chlorid carried away by the water.

In testimony whereof we have affixed our signatures in presence of two witnesses.

EDGARD CISELET.
CAMILLE DEGUIDE.

Witnesses:
ADOLPHE VOGEL,
HENRY W. PLUCKER.